July 23, 1929. N. R. ANDREWS ET AL Re. 17,378

CENTRIFUGAL EXTRACTOR OPERATING PLANT

Original Filed Dec. 27, 1922 5 Sheets-Sheet 1

INVENTORS
Nathaniel R. Andrews
Jacob Neuman
BY
C. P. Goepel
their ATTORNEY

CENTRIFUGAL EXTRACTOR OPERATING PLANT

Original Filed Dec. 27, 1922 5 Sheets-Sheet 2

INVENTORS
Nathaniel R. Andrews
Jacob Neuman
BY
C. P. Goepel
their ATTORNEY

CENTRIFUGAL EXTRACTOR OPERATING PLANT

Original Filed Dec. 27, 1922 5 Sheets-Sheet 3

INVENTORS
Nathaniel R. Andrews
Jacob Neuman
BY C. P. Sollet
their ATTORNEY

CENTRIFUGAL EXTRACTOR OPERATING PLANT

Original Filed Dec. 27, 1922 5 Sheets-Sheet 4

INVENTORS
Nathaniel R. Andrews
Jacob Neuman
BY
C. P. Goepel
their ATTORNEY

CENTRIFUGAL EXTRACTOR OPERATING PLANT

Original Filed Dec. 27, 1922 5 Sheets-Sheet 5

INVENTORS
Nathaniel R. Andrews
Jacob Neuman
BY C. P. Goepel
their ATTORNEY

Reissued July 23, 1929. Re. 17,378

UNITED STATES PATENT OFFICE.

NATHANIEL R. ANDREWS, OF YONKERS, AND JACOB J. NEUMAN, OF NEW YORK, N. Y.

CENTRIFUGAL EXTRACTOR-OPERATING PLANT.

Original No. 1,615,433, dated January 25, 1927, Serial No. 609,232, filed December 27, 1922. Application for reissue filed January 22, 1929. Serial No. 334,325.

This invention relates to the refining of crystalline substances, such for instance as sugar, and one of the objects of the invention is to provide with centrifugal apparatus, now commonly employed in separating the crystalline mass from a magma consisting of a mixture of crystals and liquor, means whereby said apparatus may be operated with a minimum expenditure of power and with the employment of a minimum amount of labor.

Another object of our invention is to obtain, by means of the methods of acceleration, retardation, electrical balancing, and automatic control employed, a more uniform and satisfactory product than is possible with methods heretofore used, and to attain certain operating economies, facilities and improvements not hitherto practiced.

In general our invention relates to a system of operation and control, embracing a method of electrical braking and balancing, in a plant utilizing, particularly in the making or refining of sugar, a plurality of centrifugal extractors driven by direct current motors.

The centrifugal process, particularly as applied in the sugar industry, consists of separating the crystals from a magma consisting of a mixture of crystals and liquor, by means of the centrifugal force set up by rotating the basket of a centrifugal extractor, commonly called a centrifugal, the liquor being thrown out through the screen which lines the perforated side wall of the basket, and the crystals remaining behind in the basket, since the mesh of the screen is such that the crystals are unable to pass through it. It is customary, in order to facilitate the separation, to apply a wash of water or diluted liquor, by means of a spray or nozzle, usually just after the bulk of the liquor has been thrown off.

Two points which are vital in obtaining the best results and which are commonly left to the hit or miss judgment of the operator, are the time in the cycle at which the wash is applied, and the length of time the charge is in process. Different grades of product require different treatment in these respects. It is, of course, an operating advantage to automatically control these operations. The discharging of the basket is commonly accomplished by means of a plow, and many serious accidents have resulted from the failure of the operator to properly judge the basket speed at which the plow may be inserted safely or from allowing the basket to attain too high speed while plowing out the charge. In cases where no bottom valve is used it is customary to deliver the charge of magma upon a horizontal distributing plate, attached to the vertical shaft or spindle of the centrifugal, while the basket is in motion. In order to avoid serious strains due to possible unequal distribution of the magma or shock due to too high velocity of the magma striking the wall of the basket, it is best to introduce the charge at as low basket speed as will cause the magma to wall up properly in the basket without loss through the openings in the basket bottom, and it is also advantageous to maintain the basket at a uniform speed while introducing the charge in order to avoid unbalancing waves set up in the charge due to slippage of the charge in the basket, which is especially marked with certain conditions of magma. It is, of course, both a safeguard and an operating advantage to indicate to the operator the proper speeds for these operations.

In order to obtain the best results in separation and obtain, as well, maximum duty from the centrifugal, positive and negative acceleration are accomplished as rapidly, and the maximum speed made as great, as is consistent with the mechanical strength of the centrifugal. The rotating parts of the centrifugal must be made comparatively heavy and well balanced in order to have the requisite strength to withstand the strains incident to the rapid positive and negative acceleration, the necessary high speed of rotation, and the weight of the charge in the basket. The usual positive acceleration time rarely exceeds 90 seconds and may be much less, while the retardation is accomplished in from 20 to 30 seconds, the entire cycle sometimes being as short as two minutes.

The windage and friction of the rotating parts of the loaded centrifugal are comparatively small, due to the smooth surfaces exposed and the well made bearings used. While the charge in the basket loses some weight during the acceleration, this is a relatively small proportion of the weight of the rotating mass, so that, when maximum speed is reached, a large proportion of the energy necessary to attain this speed is stored up as kinetic energy in the rotating mass.

The centrifugal process, therefore, presents the rather unique necessity of rapidly positively accelerating a comparatively large mass to a relatively high speed of rotation, running but a short time at this high speed, and then negatively accelerating or retarding the mass in as short a space of time as possible.

In retarding or, as it is commonly called, braking, centrifugal friction brakes are ordinarily used. Dynamic braking has also been suggested, but has not gone into use, since by its use complications are added without compensating advantage. The kinetic energy stored in the rotating centrifugal and its load and in any rotating mass, for instance the driving motor, coupled to it during retardation, is, in either case, totally dissipated in heat and wasted.

Acceleration of a centrifugal from a state of rest to maximum speed is commonly accomplished by means of a friction clutch, or by means of a group of resistance steps in series with the armature of the electric driving motor or a combination of these means. By the employment of these methods much of the power delivered from the generating station for the purpose of acceleration is dissipated in heat and wasted.

As a further consequence of the employment of these inefficient and wasteful methods of acceleration and retardation, there occur frequent, sudden, and large power demands upon the generating station, resulting in a series of large current peaks. This condition is greatly aggravated when several centrifugals are started simultaneously, and is so disadvantageous that schemes have been devised to limit the number of centrifugals started at one time, in spite of the fact that such arbitrary limitation curtails production. In any case, very much greater capacity in the generating plant has heretofore been required than is actually necessary to do the work.

Inasmuch as the structural details of an installation in which our invention may be embodied are subject to many variations, they are not shown. It will be realized, further, that many variations are possible in the types and arrangements of equipment which may be used, and that a lay-out illustrating our invention in but a single suggested embodiment, is shown in the accompanying drawings, in which—

Figure 10:
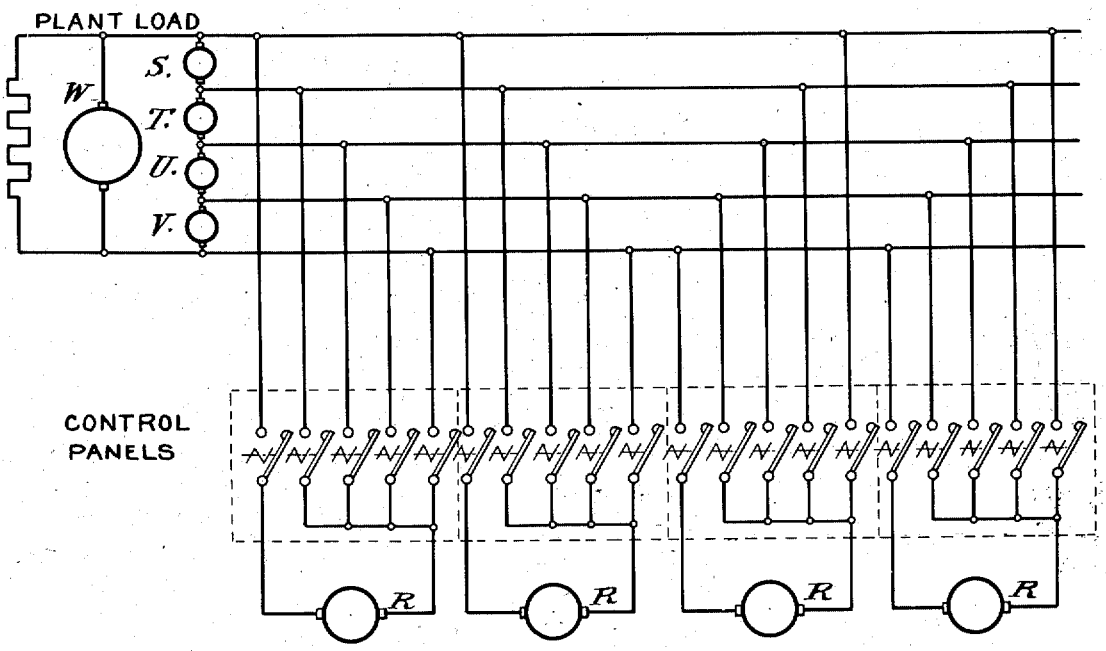
Figure 11:
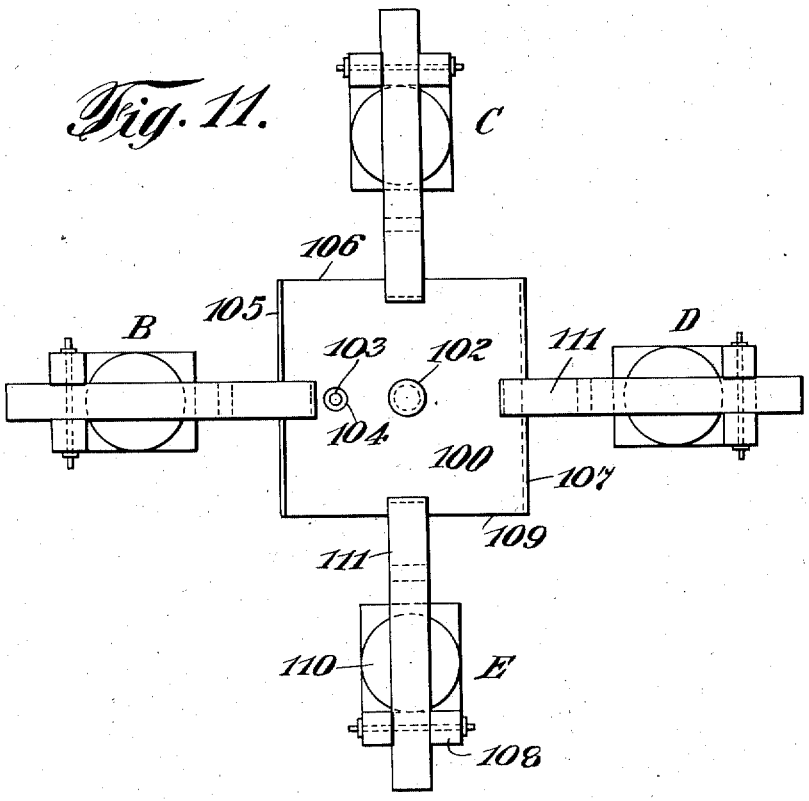
Figure 12:
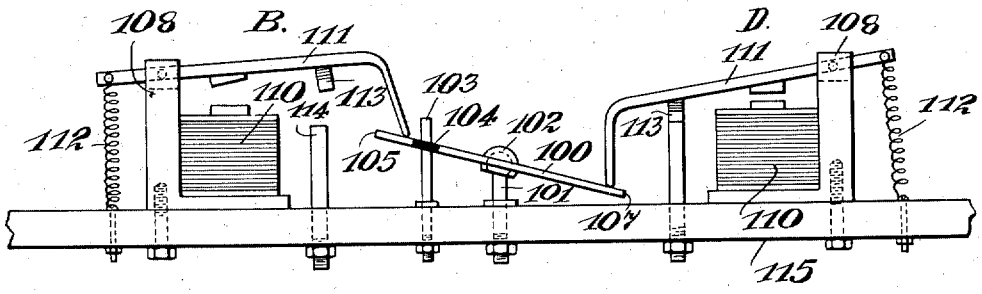

Figure 10 is a diagram of connections to a group of centrifugal driving motors. For the sake of clearness, this diagram shows only the main contactors for each motor circuit. The control circuits, not shown, are to be the same for each motor as the control circuit shown in Figure 1;

Figure 11 is a plan showing the interlocking device for magnetic switches B, C, D, and E;

Figure 12 is an elevation showing the interlocking device for magnetic switches B, C, D and E.

In the lay-out shown we have illustrated a source of power, such as one or more generators W, one only, being shown, which generate power at a sensibly constant potential called line voltage; distributing mains, or main line, to which the source of power is connected; a plant load connected to and supplied by the main line; a balancing system, connected to the main line at the positive and negative terminals respectively of the units S and V of the balancer set, comprising all circuits by which motors R may be connected to the main line, a balancer set consisting of units S, T, U and V, and fractional voltage circuits, by means of which the fractional voltages of the balancing system are made available; a manually operated switch P for controlling switch Q; the subordinate semi-automatic control switch Q, driven by motor N, controlling automatically the acceleration and retardation of motor R and certain other features of the process; the solenoid AA operating a spray valve for applying wash liquid; the time clock Y for controlling duration of process time; signals LL and L for indicating charging and ploughing speeds, respectively; and the necessary magnetic switches, magnets, solenoids, resistances, protective devices and circuits.

The motor R is a shunt, or compound, wound direct current dynamo-electric machine, preferably with interpoles, and is designed for a speed variation over a predetermined range by means of field control. The motor R is positively coupled to the centrifugal, or group of centrifugals, which it drives so that the ratio of the rate of speed of the motor to the rate of speed of the centrifugal is at any instant during constant speed, positive acceleration, or negative acceleration (retardation), a sensibly predetermined fixed and constant quantity.

Figure 1:
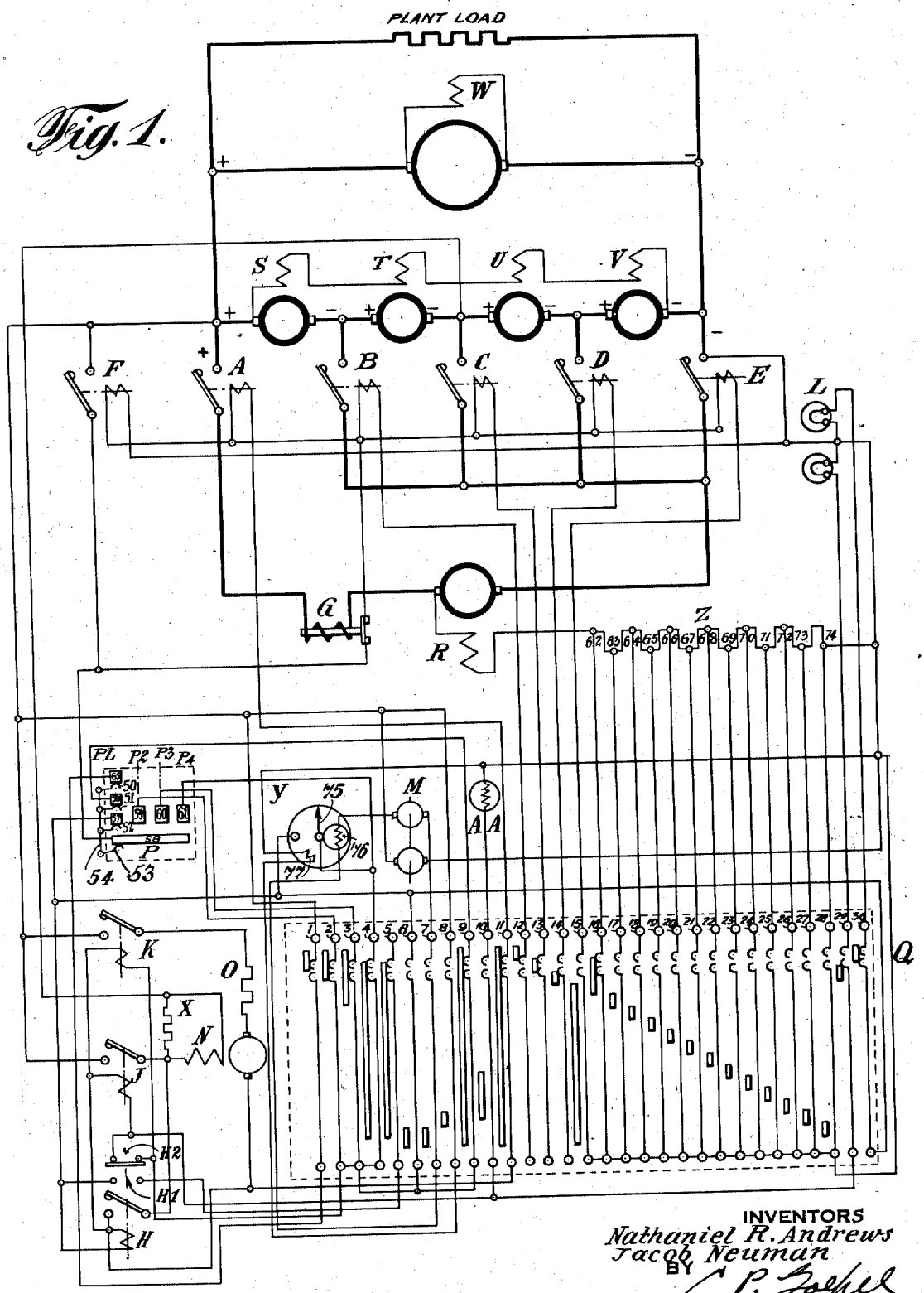
Figure 1 is a diagrammatic general scheme of a lay-out for the control and operation of an electrically driven centrifugal or plurality of centrifugals, one centrifugal driving motor and control, only, being shown.

The balancer set consists of a number of like direct current dynamo-electric machines, electrically connected in series, each machine wound for such fraction of the line voltage that the sum of the voltages equals the line voltage, and mechanically connected, the rotating elements preferably being mounted on a common shaft. The balancer set shown in Figure 1 is comprised of four direct current dynamo-electric machines S, T, U and V, each machine wound for one quarter of the line voltage.

Master switch P is manually operated to cause four contact brushes, 50, 51, 52 and 53, which are attached and electrically connected to a common bus 54, to assume different relations, in the positions $P^1$, $P^2$, $P^3$ and $P^4$, with respect to the co-operating contact strips 55, 56, 57, 58, 59, 60 and 61. The contact strips are preferably mounted on a cylinder and brought into electrical contact with the stationary contact brushes by manual rotation of the cylinder by means of a lever or handle. In position $P^1$ the contact brushes 50, 51, 52 and 53 made contact respectively with contact strips 55, 56, 57 and 58. Contact brushes 52 and 53 respectively make contact with contact strips 59 and 58 in position $P^2$, with contact strips 60 and 58 in position $P^3$, and with contact strips 61 and 58 in position $P^4$.

Figure 2:
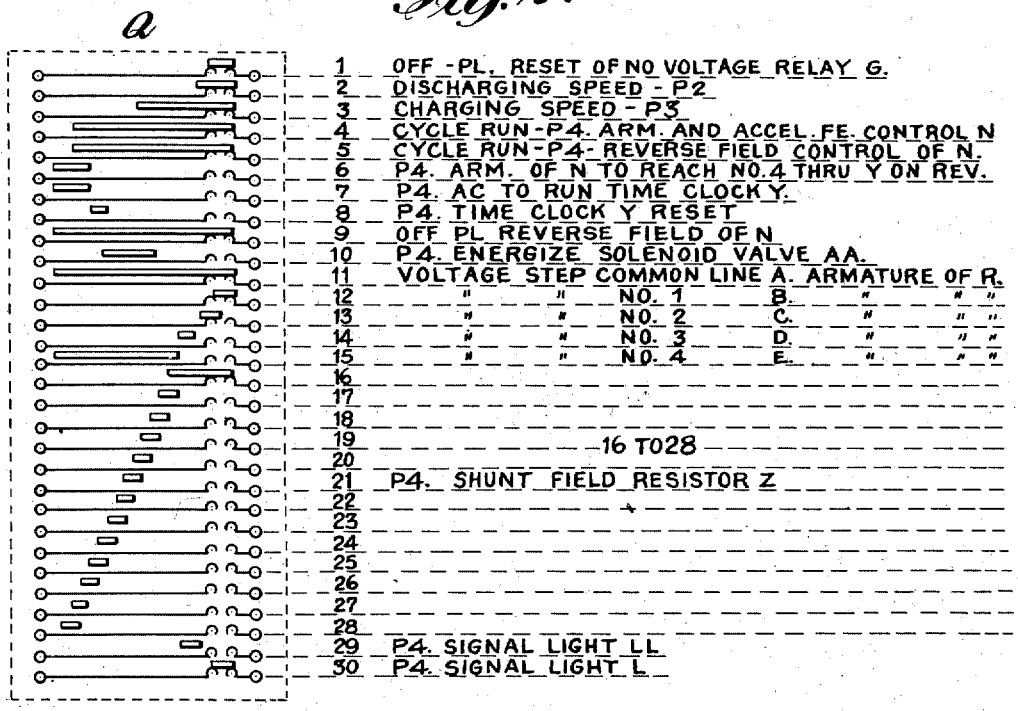
Figure 2 is a diagram of the travelling control switch.

The subordinate or traveling control switch Q consists, preferably, of a cylinder of some electrically non-conductive material, rotated by means of a pilot motor N, and carrying contact strips electrically connected as shown, which, as the cylinder revolves, make various predetermined electrical contacts with associated stationary contact brushes. In Figures 1 and 2 the surface of the cylinder is shown as a developed surface and the direction of movement relative to the stationary brushes which will cause positive acceleration of the motor R and which will hereafter be designated as "forward direction" is taken to be as from the bottom toward the top of the sheet in Figure 1, and as from the left to the right of the sheet in Figure 2. The opposite movement will be designated as "reverse direction".

A simple interlocking arrangement for the switches B, C, D and E is illustrated in Figures 11 and 12. The four switches are grouped around a square locking plate 100 mounted for universal movement on a stud 101 by a ball joint 102. A pin 103 passing freely through a hole 104 in the plate prevents its rotation on the stud 101. The several switch levers 111 are pivoted on the brackets 108 carrying the several solenoids 110 and mounted on the supporting panel 115. At one end the switch levers bear on the upper face of the plate 100. At their opposite ends are springs 112 tending constantly to move the levers to open-circuit position. The contacts 113 carried by the levers co-operate with the fixed contacts 114 mounted on the panel, the relation of the contacts being such that they do not engage until the adjacent margin (105–6–7–9) of the locking plate engages or approximately engages the panel. Upon energization of one or other of the switch solenoids 110, the plate is rocked downward by the switch bar associated with the energized solenoid and the remaining switch levers are thus fixed and maintained in open-circuit position until that solenoid is de-energized and the plate permitted to rock in some other direction.

Electrical braking, or as it is commonly called, regenerative braking, is used in retarding or braking the centrifugals, and an explanation and description of the novel method employed and the economics attained by its use in conjunction with the balancing system will now be given before tracing through the process in detail. Although the maximum voltage, circuits to which motors R are connected are for the purpose of electrically balancing properly parts of the balancing system, in order to avoid confusion in the description they will be referred to as "main line". Also for convenience, the term motor, as for instance motor R, will be used to designate a dynamo-electric machine which may at the time be acting in the capacity of a generator.

Assume for the purpose of facilitating the description and explanation following that the voltage of the main line is maintained sensibly constant at, for instance, 240 volts by the generator, or generators, W. Assume also that motor R is so designed that when a difference of potential of 240 volts is applied at its armature terminals it will satisfactorily operate, as a motor, throughout a speed range of say 3 to 1, for instance, 300 R. P. M. to 900 R. P. M., by means of field control. As shown in Figure 1, one terminal of the shunt field of motor R is connected to the positive side of the line and the other terminal to the negative side of the line through the resistance Z, any percentage or all of which may be short circuited. The shunt field and the resistance Z are so proportioned that with a 240 volt difference of potential applied at the armature motor R will operate at 300 R. P. M. with all of the resistance Z short circuited, or maximum field condition, and at 900 R. P. M. with all of the resistance Z in circuit, or minimum field condition.

Now suppose that motor R is operating at 900 R. P. M. and driving a centrifugal and its charge. Due to the characteristics of the centrifugal, previously explained, a large proportion of the useful energy expended in accelerating the loaded centrifugal from a state of rest to full speed is now stored as kinetic energy in the rotating parts of the centrifugal and its load, and, of course kinetic energy is also stored in the rotating parts of the motor R.

If the motor R be now totally disconnected from the line, friction and windage will in time bring the rotating masses to rest.

If, while the motor R is running, the armature only be disconnected from the line and the field strength maintained constant, a difference of potential will exist at the armature terminals, and this E. M. F. will decrease in value as the speed slackens with a consequent reduction in the number of lines of force cut per unit of time by the conductors of the armature, finally becoming zero as rotation ceases.

Since motor R operating as a motor on the 240 volt line, is capable of generating a counter E. M. F. only slightly less than 240 volts either at a speed of 300 R. P. M. with maximum field condition or at a speed of 900 R. P. M. with minimum field condition, and hence, of course, at any intermediate speed with properly proportioned field strength, it is evident that if the armature be disconnected from the line while the motor is at full speed, it is possible, by immediately strengthening the field, to cause sufficient lines of force to be cut by the armature conductors per unit of time to produce a difference of potential of 240 volts, or more, at the armature terminals, and it is further evident that it is possible by progressively strengthening the field in such manner that, although the speed is decreasing, the rate of cutting the lines of force remains sensibly constant, to maintain this value of E. M. F. of 240 volts or more, as the case may be until the speed has decreased to a point where with maximum field strength this rate of cutting of the lines of force cannot be maintained.

Now it follows that if motor R, driven by the momentum of the rotating parts of the extractor and its own rotating mass, be again connected to the 240 volt line at any instant when its generated E. M. F. is greater than the 240 volts of the line, current must flow at least momentarily in a direction opposite to the direction of current flow which obtains when motor R is taking energy from the line as a motor, since the E. M. F. generated by motor R is sensibly a counter E. M. F., the direction of rotation and polarity of field not having been changed; and it is also evident that this current flow, or delivery of power by motor R acting as a generator, to the line can be maintained by progressively strengthening the field, as the speed decreases, at such a rate that at any instant a sufficient number of lines of force are being cut per unit of time by the armature conductors to maintain at the armature terminals an opposing E. M. F. of higher value than the E. M. F. of the line, and that this difference in E. M. F. and consequent delivery of power to the line can be maintained until the speed has decreased to such extent that, with maximum field, the rate of cutting of the lines of force is insufficient to maintain it.

In the case of a dynamo or generator a torque is exerted in opposition to the driving force and the value of this torque depends upon the intensity of the magnetic field and the value of the armature current and is increased or decreased respectively by an increase or decrease in either, or both, of these factors. Also since the ohmic drop of the armature is comparatively small, it is apparent that a small increase in the E. M. F. generated is sufficient to cause a comparatively large current through the armature.

It is, of course, evident that it is not necessary to disconnect the motor R from the line to accomplish these results, but to simply strengthen the field sufficiently to obtain the desired braking torque and maintain this torque, or increase it if desired, by progressive strengthening of the field.

In our system, before the point is reached at which, with maximum field, it is impossible for motor R to deliver power directly to the main line, the armature is disconnected from the main line and connected to one of the fractional voltage circuits of the balancer system. With the main line voltage 240 volts, as assumed, and the balancer set consisting of four units as described, the armature would first be disconnected from the 240 volt line and then connected immediately to the 180 volt line of the balancing system. A difference of potential is thus obtained and motor R continues to deliver power and provide a braking torque. Before the point is reached at which it is impossible for motor R to deliver power to the 180 volt line, the armature is disconnected from the 180 volt line and connected to the 120 volt line, and then in turn and in like manner, to the 60 volt line. Weakening the field strength at the moment of making the changes described and then increasing the field to full strength after the change is made is preferable in that it causes a more uniform braking torque and less variation in the current delivered.

Provided no external connections are made between any of the taps taken off at the junction of the armature terminals between adjacent dynamo-electric machines or units S, T, U and V of the balancer set or between any of said taps and either side of the main line, the action of the balancer set when connected to the main or 240 volt line, is that of a motor running with no load, drawing only enough energy from the line to supply its own inherent heat and friction losses, and generating a counter E. M. F. equal to a value slightly less than the 240 volts of the line. Now, since the units of the set are exactly alike, the difference in potential between the armature terminals of each unit is one-fourth of the E. M. F. of the line or 60 volts. The potential of two units in series is, of course, 120 volts and of three units in series, 180 volts. It is evident, then, that between either side of the line and certain of these taps potential differences of 60, 120 and 180 volts exist. The circuits by means of which these potential differences are made available are the fractional voltage circuits of the balancing system and are shown in Figure 1 for one motor R only and in Figure 10 for a plurality of motors R.

If, while running as a motor, as described above, a mechanical load were applied to the shaft, the balancer set would draw sufficient electrical power from the line to drive it, the speed decreasing a sufficient amount to lower the counter E. M. F. so that enough current would flow in the armature circuit to provide the requisite torque. It is also evident that were mechanical power applied to the shaft and the armatures rotated at sufficient speed, the fields remaining at constant strength, an E. M. F. greater than the line E. M. F. could be generated, and the balancer set made to deliver current to the 240 volt or main line.

Now if, when the balancer set is running as a motor and taking just enough power from the line to supply its own inherent heat and friction losses, a greater difference in potential be caused to exist between the armature terminals of a unit of the set than the normal difference of potential of 60 volts, an increase in the amount of current in the armature of this unit will result. This, of course, increases the torque of this unit and accelerates its speed, but since all the armatures of the set are mounted on a common shaft, all the armatures must accelerate and the counter E. M. F. of the balancer set will be raised. If sufficient electrical power is delivered to the one unit to more than supply the losses of the set, the counter E. M. F. will be raised to a value exceeding the E. M. F. of the main line and consequently power will be delivered to the main or 240 volt line.

The same reasoning holds when an E. M. F. greater than 120 volts is applied to two units of the set in series, or an E. M. F. greater than 180 volts to three of the units in series.

The application of electrical load, on the other hand, to one of the units of the balancer set will, of course, cause the potential difference between the armature terminals of this unit to decrease to a value below normal. This causes the armature speed of this unit to retard with consequent retardation of the speed of the set, lowering of the counter E. M. F. of the set, and increase in the amount of current drawn by the set from the main line. The additional amount of electrical power supplied the set from the main line is just sufficient to balance the electrical power delivered by the unit of the set under electrical load.

The same reasoning applies when electrical load is applied or power demanded from two units of the set in series, or three units of the set in series.

Motor R is positively accelerated to its normal speed under maximum field condition, by means of connecting the armature in turn to successively higher potential fractional voltage circuits, which would be the 60, 120, and 180 volt circuits available with the four unit balancer set and 240 volt line assumed, and finally to the 240 volt or main line circuit, the field strength preferably being strengthened at the moment of making a connection and then weakened in order to obtain a more uniform flow of current and consequently more nearly constant value of torque. After the connection of the armature to the main line further acceleration up to maximum rated speed is obtained through weakening the field strength by progressively increasing the resistance in series with the shunt field.

In a plant utilizing a plurality of motors R, motors retarding and connected to one of the fractional voltage circuits of the balancing system may at times be delivering just sufficient power to the circuit to supply another motor or motors positively accelerating on the same circuit, and it is apparent that this transfer is possible without affecting the balancer set. Or, the power required for motors accelerating positively on one or more of the fractional voltage circuits may be just balanced by the power delivered to one or more of these circuits by motors negatively accelerating or retarding, by means of the balancer set, without affecting the main line. Any excess of demand over supply in the fractional voltage circuits will be met by a demand on the main line for power and any excess of supply over demand in the fractional voltage circuits will be taken care of by a delivery of power to the main line at sensibly the potential of the main line.

Power delivered directly to the main line by motors retarding with armatures connected to the main line, will be, at times, just sufficient to supply the demand for power by motors positively accelerating with armatures connected to the main line. In this case the transfer of power is made without affecting the generator or generators W, or, all or a portion of the power delivered directly to the main line by retarding motors, may be distributed through the balancer set to supply the demand of motors positively accelerating on the fractional voltage circuits, or, again, power delivered by retarding motors to the line, by means of the balancer set, may be used by motors positively accelerating on the main line voltage without affecting generator or generators, W.

Generator or generators, W is therefore only called upon to deliver at any instant, for the use of the centrifugal driving motors R, any excess of demand for power over the supply of power made available by the electrical braking. Any excess of power delivered by means of electrical braking over the demand for power for driving centrifugals, at any instant, is available for use in the plant load, relieving generator, or generators, W by this amount.

Since the motor N which rotates switch Q may be made to vary its speed, by means of a variable resistance either in series with its armature or shunt field, and since it is apparent that this resistance may be easily varied, if required, by means of control strips and co-operating brushes of the switch Q itself, it is evident that the control of the time intervals at which armature connections of motor R are changed and the rate at which the field strength of motor R is varied, may be made extremely flexible and that, within the heat radiating capacity of motor R, the driving and braking torques may be held sensibly constant or practically varied at will in any manner desired.

Also since motor R operates for the greater portion of the time both as motor and generator directly on main line voltage under field control, it is apparent that it can be designed to operate at high efficiency, throughout this range. Further, since the series of voltage steps by which it is accelerated up to its normal rated speed with maximum field, or by means of which it delivers power during retardation, are obtained, not by the ordinary wasteful resistance steps in series with the armature, but either directly by motors accelerating or retarding, or by means of the balancer set, which is itself an efficient dynamo electric machine, it is evident that efficient operation is secured also over this range.

Now, the windage and friction of the loaded centrifugal being small, as explained previously, and the motor and generator action of motor R being efficient, it is apparent that a large proportion of the energy used in positive acceleration is made available during retardation, and that the method of driving and braking is, as a whole, extremely efficient as compared to methods heretofore employed.

Since a sensibly constant torque is required for the process, with its consequent even current demand, and because of the balancing system, demand for power on the generating station is much less than with other methods, and the peak demands much less frequent and erratic, allowing the operation of more centrifugals of a given size and duty by a power plant of given capacity than has hitherto been possible.

Uniformity of product and economy of labor also result from the uniform cycle of operations and the elimination of the human element in the timing of the vital features of the process which must be exactly duplicated in each cycle to obtain the best results from the process with a given grade of material.

A cycle of operation for a single centrifugal will now be given in detail. The circuits are traced out as shown in Figure 1, but, for the sake of clearness, reference will be made also to the elementary diagrams shown in Figures 2 to 9.

Assume the centrifugal driving motor R to be at rest and that the operator wishes to start the machine into operation. (It will be assumed that switch F is closed.) The manually operated switch P is now turned to the third position $P^3$.

Figure 3:
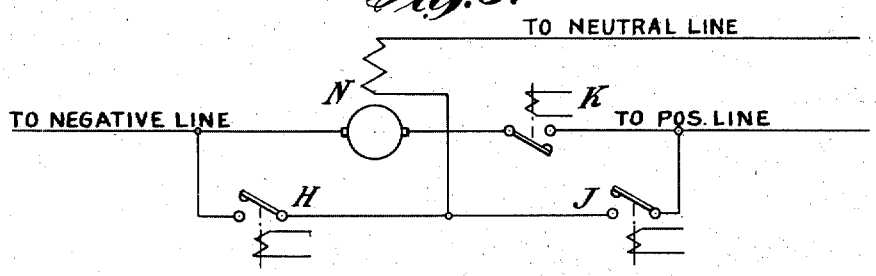
Figure 3 is a diagram of the pilot motor reversing circuit.
Figure 4:
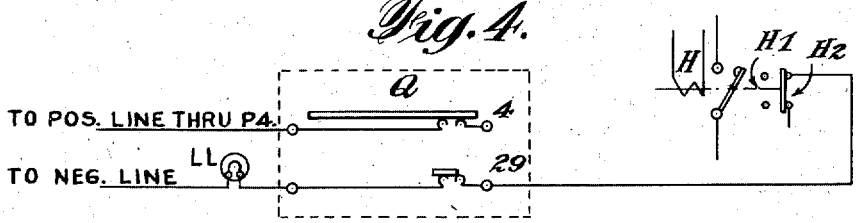
Figure 4 is a diagram of the signal light circuit for safe charging speed.

Referring to Figure 1, it will be seen that this operation closes the circuit from the positive line through switch F, through contact strips, 58 and 60 and their associate brushes 53 and 52 on switch P, through contact strip 3 and its associate brushes on switch Q, through interlock $H^2$ on switch H, through the magnet coil of switch J, and then directly to the negative line. This causes the switch J to close, thereby connecting the positive line to the shunt field the pilot motor N (Fig. 3). This connection energizes the shunt field in such manner that its polarity is such as to allow the pilot motor N to so rotate that, by virtue of its mechanical connection to switch Q, that part of switch Q carrying the contact strips is moved in the proper direction for accelerating motor R.

Figure 5:
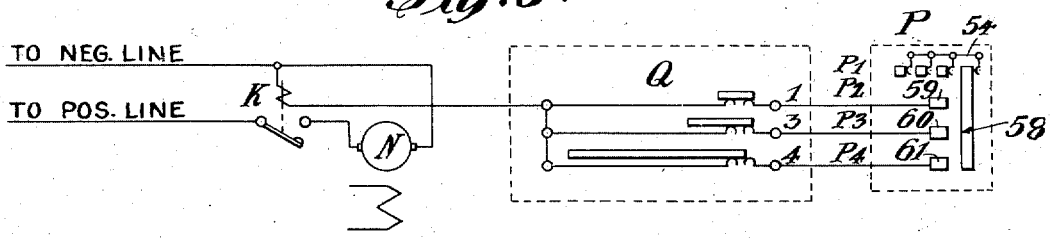
Figure 5 is a diagram of the charging, cycle run, and discharging circuits.
Figure 6:
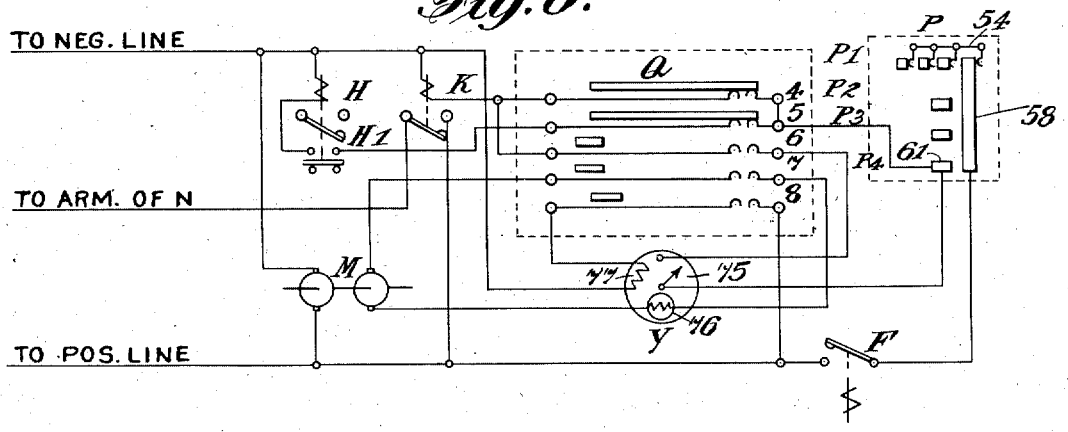
Figure 6 is a diagram of the time-clock circuit.

Referring to Figure 5, it will be seen that the switch K will be closed, due to closing the circuit from the positive line through switch K, through contact strips 58 and 60 and their associate brushes on switch P, through contact strips 3 and its associated brushes on switch Q, thence to the magnet coil on switch K, the other side of the magnet coil of switch K being directly connected to the negative line. The closing of this switch K (Figure 5) connects the positive line to the armature of the pilot motor N. This causes the pilot motor N to rotate, since the other side of its armature is connected directly to the negative line, and its shunt field energized through switch J. The rotation of the pilot motor N will continue until the brushes associated with contact strip 3 ride off that contact strip. This causes the circuit to open between the brushes of contact strip 3 on switch Q, (Figure 1) which disconnects the positive line from the magnet coils of switches J and K. This causes magnetic switches J and K to open circuit, which disconnects the positive line from the armature (Figure 5) and the shunt field (Figure 3) of the pilot motor N. This opening of switches J and K causes the pilot motor N to stop rotating and brings the switch Q to a state of rest.

Several contact strips on the pilot motor switch Q have been brought into circuit during this rotation of the pilot motor. Switch A (Figure 1) has been closed due to circuit being made to its magnet coil from the positive line through switch F, through relay G, and to the magnet coil of switch A, the negative circuit being closed from the negative line connected at switch E through contact strip 11 and its associated brushes on switch Q, thence to the magnet coil of switch A. The closing of switch A causes the positive line to be connected to the armature of the driving motor R through overload relay G.

Switch B has been closed due to the positive circuit being made to the magnet coil in the same manner as switch A, and the negative line tapped at switch E (Figure 1), through contact strip 12 and its associated brushes on switch Q thence to the magnet coil on switch B. The closing of switch B causes the negative side of the unit S of the balancer set to be connected to the armature of the driving motor R. This impresses the voltage of unit S across the driving motor R, and this voltage remains impressed until the switch B opens circuit due to the brushes associated with contact strip 12 on switch Q running off that strip and thereby opening the negative circuit to the magnet coil of switch B. Switch C was closed directly after switch B opened, due to the positive circuit being closed to its magnet coil in the same manner as switch A, and the negative circuit connected at switch E, (Figure 1) through the contact strip 13 and its associated brushes on switch Q, thence to the magnet coil of switch C. The closing of switch C caused the negative side of the machine T to be connected to the armature of the driving motor R. This impresses the voltage of units S and T of the balancer set in series across the driving motor, and this voltage remains impressed until the switch C opens circuit due to the brushes associated with contact strip 13 on switch Q running off that strip and thereby opening the negative circuit to the magnet coil of switch C.

In similar manner switch D is brought into circuit through contact strip 14 and its associated brushes thereby applying the voltage of the three units S, T and U, in series, across the motor R.

The pilot motor being brought to rest at this position, due to the switch P being on position $P^3$ as explained previously, the motor R continues to rotate at the speed imparted by the voltage application of units S, T and U in series.

To indicate to the attendant that the motor R is rotating at this speed a signal LL is energized. This is accomplished by tapping the negative line at switch E and connecting direct to signal LL (Figures 1 and 4) and feeding from the positive line through switch F, through contact strips 58 and 60 or 61 and their associated brushes on switch P, through contact strip 3 or 4 and its associated brushes on switch Q, through interlock $H^2$ on switch H, through contact strip 29 and its associated brushes on switch Q, and thence to the signal LL.

It will be noted that the field of the motor R has been fully energized during all these events, due to the positive side being tapped off at the brushes of motor R and the negative side being tapped at switch E (Figure 1), feeding the shunt field of motor R, through the paralleled circuit consisting of resistor Z which is practically short circuited by line tapped at 62 on resistor Z, and thence through contact strip 16 and its associated brushes on switch Q, and thence to the negative line.

Assume that the centrifugal extractor machine has been charged or loaded at this speed and the attendant now desires to proceed.

The manually operated switch P is now turned to position $P^4$ (Figure 1). This causes the switches J and K to close in the same manner as previously described for position $P^3$ of the switch P, except that now the positive circuit is fed through contact strips 58 and 61, and their associated brushes on switch P (Figure 5) and through contact strip 4 and its associated brushes on switch Q. The closing of switches J and K causes the motor N to again set the switch Q in motion in the proper direction for positive acceleration of motor R.

The pilot motor N continues to rotate and impart motion to the switch Q (Figure 1) until the brushes, associated with contact strip 4 on switch Q, run off this contact strip, which opens the positive circuit to magnet coils of switches J and K, which in turn causes these contactors to open, thereby causing motor N and consequently switch Q to assume a state of rest.

During the period of movement of the switch Q several events have taken place:

The switch D (Figure 1) was caused to open circuit, disconnecting the third voltage step from the motor R by reason of the brushes associated with contact strip 14 running off that contact strip and thus disconnecting the negative line from the magnet coil of switch D.

Switch E (Figure 1) was closed directly after switch D opened, due to the fact that connection is made from the positive line through switch F, through overload relay G and thence to the magnet coil of switch E, and connection is made from the negative line by tapping it at switch E, thence through contact strip 15 and its associated brushes on switch Q, and thence to the magnet coil E. The closing of switch E causes the negative line of generator W to be connected to the armature of the driving motor R.

The motor R is then further accelerated by weakening of the shunt field. This is accomplished by feeding from the negative line, tapped at E, (Figure 1) through contact strip 17 and its associated brushes, thence to resistance tap 63 on resistor Z and through this resistance to the shunt field of motor, thus reducing the current to the shunt field of the motor R and thereby weakening the field and causing the motor to accelerate to a higher speed.

As the switch Q progresses, the field of motor R is further weakened and the motor thus accelerated to maximum speed by means of progressively inserting more resistance in series with the motor field circuit by connecting resistance taps 64, 65, 66, 67, 68, 69, 70, 71, 72, 73 and 74 of resistor Z through contact strips and their associated brushes on switch Q, numbers 18, 19, 20, 21, 22, 23, 24, 25, 26, 27 and 28 respectively in similar manner as described previously in case of tap 63.

During this travel of the switch Q the magnet AA operating a valve (Figure 1) was energized due to the negative line, tapped at switch E, being directly connected to one side of the magnet AA, and the positive line through switch F, through contact strips 58 and 61 and their associated brushes on switch P, through contact strip 4 and its associated brushes on switch Q, through interlock $H^2$ on switch H, through contact strip 10 and its associated brushes on switch Q, and thence to the magnet AA.

The closing of the circuit for the magnetically operated valve actuated by magnet AA causes wash liquid to be applied to the charge in the centrifugal, the quantity being governed by the length of the contact strip 10 on the switch Q and the speed of the pilot motor N.

The interlock $H^2$ on switch H opens circuit when the switch H closes. This disconnects the positive line from the magnet AA, the light LL and the switch J.

It will be noted that when the switch Q came to rest by reason of brushes running off contact strip 4 on switch Q, the contact strip 7 (Figure 6) and its associated brushes were in contact. This closes an alternating current circuit through contact strip 7, and its associated brushes on switch Q from alternating current generator M to a small motor 76 in the time clock Y, thereby causing the time clock Y to start. The contact hand 75 closes contact after the time has elapsed for which the clock has been set, thereby causing magnetic switches H and K to close circuit by reason of the negative line being connected direct to the magnet coils of switch H and K (Figure 6) and the positive line feeding to them through switch F (Figure 1) to contact strips 58 and 61 and their associated brushes on switch P, through contact hand switch 75 on time clock Y, thence to magnet coil on switch H, thereby closing switch H and connecting the negative line to the shunt field of the pilot motor N, (Figure 3) and thereby energizing this field in an opposite direction to which it was energized when the switch J was closed. Therefore, the motor N will rotate in a reverse direction. The positive side is connected to the magnet coil of switch K (Figure 6) through switch F, through contact strips 58 and 61 and their associated brushes on switch P, through contact hand switch 75 on time clock Y, through contact strip 6 and its associated brushes on switch Q, and thence to magnet coil of switch K. The energizing of this magnet coil closes switch K. The closing of switch K connects the positive line to the armature of the pilot motor N (Figure 3) thereby causes the motor to rotate in a reverse direction. This rotation causes the switch Q to move in the reverse direction. This rotation will continue until the brushes on switch Q run off segment 7. The switch K would then open circuit if it were not for contact strip 4 and its associated brushes which have come into contact and now complete the positive circuit to the magnet coil of switch K, the remainder of the circuit to magnet coil of switch K being the same as previously described.

During the movement of the switch Q just described, contact strip 8 and its associated brushes have closed circuit causing the reset coil 77 on time clock Y (Figure 6) to be reset. The negative line is connected direct to the reset coil 77 and the positive line fed through contact strip 8 and its associated brushes on switch Q, and thence to reset coil 77 on time clock Y. The resetting of the time clock Y causes the contact hand 75 to open the positive circuit to the magnet coil on switch H, but this switch does not open due to the circuit now being made through switch F, through contact strips 58 and 61 and their associated brushes on switch Q, through interlock $H^1$ on switch H, and thence to magnet coil on switch H, which keeps magnet coil on switch H energized.

The interlock $H^1$ closes circuit when switch H is closed. Thus the pilot motor N continues to rotate and move switch Q in a retarding or reverse direction. The movement of the switch Q continues until the segment 4 ends and its associated brushes on switch Q ride off the segment (Figure 6) thereby opening the positive circuit to the magnet coil of switch K which causes switch K to disconnect the positive line from the armature of the pilot motor N (Figure 3), thereby causing the pilot motor and the switch Q to come to a state of rest.

During this movement of the switch Q several contact strips have functioned.

The resistance step 73 of the resistor Z (Figure 1) was short circuited by feeding from the negative line through contact strip 27 and its associated brushes of switch Q, and thence to 73 on resistor Z.

This increased the current supplied to the shunt field of motor R and thereby strengthened the field. In similar manner resistance steps 72, 71, 70, 69, 68, 67, 66, 65, 64, 63, and 62 on resistor Z (Figure 1) are short circuited respective to contact strips 26, 25, 24, 23, 22, 21, 20, 19, 18, 17 and 16 and their associated brushes on switch Q. This progressively strengthens the field of the motor R and causes delivery of power by, and consequent retardation of the motor R.

The magnetic switches A, B, C, D and E are again brought into circuit in similar manner as previously described, only in reverse order. This causes further delivery of power by, and consequent retardation of, the motor R.

The signal L (Figures 1 and 8) had been energized by reason of the negative line being connected direct to the signal L and the positive line fed through switch F; through contact strips 58 and 61 and their associated brushes on switch P, through contact strip 5 and its associated brushes on switch Q through interlock $H^1$ on switch H, through contact strip 30 and its associated brushes on switch Q thence to signal L. This signal indicates to the attendant that safe ploughing speed has been reached.

If the attendant now desired to plough out the machine he will turn the switch P to position $P^2$ thereby causing switches J and K to close circuit and start the pilot motor in the same manner as described for position $P^3$, only, in this case, the positive circuit will be fed through contact strips 58 and 59 and their associated brushes on switch P (Figure 5) and contact strip 2 and its associated brushes on switch Q. This will allow the pilot motor to rotate until strip 2 on switch Q terminates, which will be the proper speed for discharging the machine.

Figure 7:
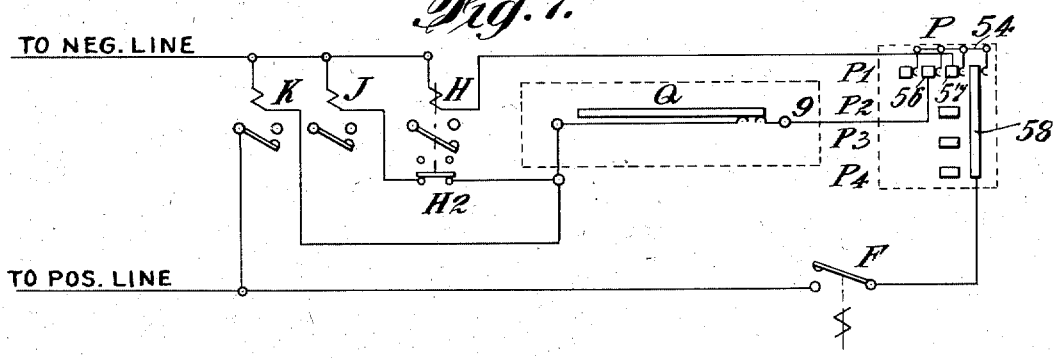
Figure 7 is a diagram of the off-reverse control circuit.
Figure 8:
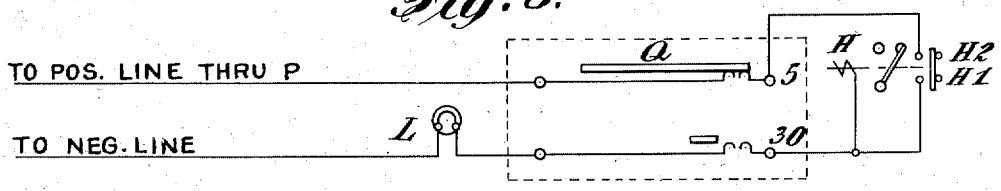
Figure 8 is a diagram of the signal light circuit for safe ploughing speed.

If it is desired to bring the centrifugal to rest at any time during the cycle, it is only necessary to turn the switch P to position $P^1$, Fig. 7. This causes switch J to open and switch H to close. The negative line is directly connected to the magnet coil of switch H and the positive line fed to it through switch F, through contact strips 57 and 58, and their associated brushes on switch P and thence to magnet coil on switch H, thus causing switch H to close and interlock $H^2$ to open. The interlock $H^2$ opens the positive circuit, fed from contact strip 9 and its associated brushes, to the magnet coil on switch K, thus opening switch K.

Referring to Figure 3, it will be seen that when switch J is opened and switch H is closed, the shunt field of pilot motor N is disconnected from the positive line and connected to the negative line thereby reversing the field of the pilot motor N since the other side of the field is connected directly to the neutral line. This reversal causes the switch Q to reverse and causes delivery of power by, and consequent retardation of, the motor R.

Figure 9:
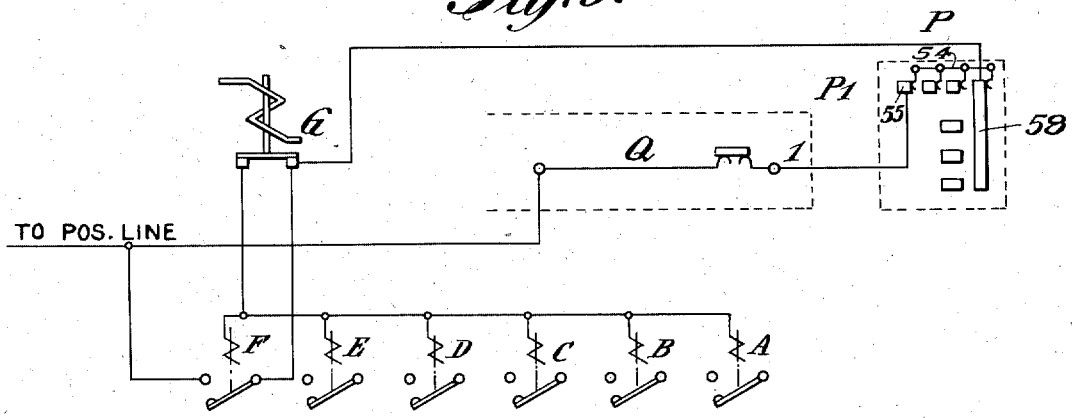
Figure 9 is a diagram of the no voltage reset and overload relay circuits.

If the voltage on the lines fails and then returns, voltage cannot be applied to the motor R by switches A, B, C, D and E, Figure 9, since it is necessary to reset switch F before the positive line may be connected to any of the magnet coils of switches A, B, C, D and E.

The switch F can be reset only when switch P is at position $P^1$ and switch Q is at the start or off position (Figure 9). Switch F is then reset or closed by connection from the positive line feeding through contact strip I and its associated brushes on switch Q, through contact strips 55 and 58 and their associated brushes on switch P, through relay G, then to magnet coil of switch F, the negative line being connected direct to the magnet coil of switch F. Once the switch F closes, the positive side is fed to its magnet coil through switch F, through relay G, and thence to magnet coil. This allows the energizing of the magnet coil of switch F to be independent of the position of the switches P and Q, once the switch F has closed.

If an overload should occur on the motor R it would open the relay G, Figure 9, and thereby disconnect the positive line from the magnet coils of switches A, B, C, D, E, and F which disconnects all energy from the motor R.

In order to reset the circuit it would now be necessary to reset switch F as previously described.

It will be obvious to those skilled in the art, that various alternatives are possible, of which the following are examples:—

Units consisting of storage batteries, motor-generator sets, rotary converters or other suitable devices may be substituted for the dynamo electric machine units, such as S, T, U and V, of the balancer set described.

Switch Q may be eliminated and the centrifugal driving motor controlled by means of a hand operated drum controller and interlock contactors, or, the field current of motor R may be varied by the use of a constant current relay.

Instead of the construction shown, switch Q may be of the rotating drum, or of the reciprocating plate type, either with the drum, disc or plate stationary and the cooperating brushes moving or vice versa.

Or instead of driving by means of a motor, switch Q may be magnetically operated.

It will accordingly be seen that we have provided a system wherein, among others, all the ends and objects above pointed out are accomplished in a most efficient manner and that by means of the associated mechanism above described, the separation of the crystalline sugar from its magma may be accomplished more economically than in apparatus of this type as hitherto constructed.

As many changes could be made in this construction without departing from the scope of the following claims, it is intended that all matter contained in the above description or shown in the accompanying drawings, shall be regarded as illustrative only and not in a limiting sense.

Having thus described our invention what we claim as new and desire to secure by Letters Patent is:

1. In a system of regenerative braking control adapted for centrifugal extraction of solids, in combination with a direct current shunt or compound wound dynamo-electric machine having its armature at all times connected with the main source of sensibly constant potential, a resistance in series with the shunt field, any portion or all of which may be short circuited, a source of electrical energy at sensibly constant potential to energize the shunt field, an automatic control means adapted to so progressively short circuit said resistance as to effect a braking torque of predetermined value and, as the speed of the armature of the dynamo-electric machine decreases, maintain said value or increase it or vary it in a predetermined manner throughout a predetermined portion of the braking period, said circuit of sensibly constant potential being connected in series with said armature and receiving the energy developed by said dynamo-electric machine.

2. In apparatus of the class described, the combination with a centrifugal extractor adapted to separate crystal sugar from its magma, and a direct current shunt or compound wound dynamo-electric machine, of a system of regenerative braking control comprising in combination with said direct current shunt or compound wound dynamo-electric machine, a resistance in series with the shunt field, any portion or all of which may be short circuited, a source of electrical energy at sensibly constant potential adapted to energize the shunt field, an automatic controlling means adapted so to progressively short circuit said resistance as to effect a braking torque of predetermined value upon said centrifugal extractor, and as the speed of the armature of the dynamo-electric machine decreases maintain said value, increase it or vary it in a predetermined manner throughout a predetermined portion of the braking period, and a circuit of sensibly constant potential in series with the armature of said dynamo-electric machine and with which said armature is at all times connected and adapted to receive the energy developed by the latter machine.

3. In a system of regenerative braking control adapted for centrifugal extraction of solids, in combination with a direct current shunt or compound wound dynamo-electric machine, a source of electrical energy at constant potential to energize the shunt field of said dynamo, units comprising a set capable of delivering, at sensibly the potential of the main source of energy or at lower predetermined potentials, electrical energy received by one or more of said units at a lower potential than the main source of electrical energy or other lower predetermined potentials, circuits to connect the armature of the dynamo-electric machine with any required number of said units to effect the delivery by said set at said predetermined potential of the electrical energy delivered by the dynamo-electric machine to said required number of units at some potential less than said predetermined potential, electro-responsive switches adapted to open and close said circuits, an automatic switch by means of which said electro-responsive switches are operated to so effect progressively, step by step, a decreasing ratio of the potential at which electrical energy can be received by a unit or units of said set to the said predetermined potential whereby at any instant during the braking and consequent decrease in speed of the armature of the dynamo-electric machine the potential generated by the dynamo-electric machine is sufficient to deliver electrical energy to a unit or units of said set, and an interlocking device to prevent the use of more than one of said circuits at the same time.

4. The combination with a plurality of centrifugal extractors and a plurality of direct current shunt or compound wound dynamo-electric machines, of a balancing system which makes available circuits of a certain sensibly constant maximum potential, circuits of a sensibly constant minimum potential which is a fractional part of the maximum potential, and other circuits the sensibly constant potential of each of which is a fractional part of the maximum potential and a mutiple of the minimum potential, so constructed and arranged, that the power generated by one or more of the direct current shunt or compound wound dynamo-electric machines coupled to centrifugal extractors negatively accelerating and delivering power to any of said circuits is utilized wholly or in part to positively accelerate or operate at constant speed another or others of said direct current shunt or compound wound dynamo-electric machines coupled to one or more of said centrifugal extractors and connected to any of said circuits, whereby any excess of power delivered by said dynamo-electric machines negatively accelerating over the power required by other of said dynamo-electric machines positively accelerating is available for use at the said maximum potential of the balancing system.

5. In automatic control means for centrifugal operating motors of the direct current shunt or compound wound type having a current supply source of sensibly constant potential, means for first progressively accelerating and then progressively retarding the operation of said motor during predetermined periods of time, said means including a plurality of electric circuits for supplying current from said supply source at variable potentials to the armature terminals of the motor, additional circuits for varying the field potential of the motor while maintaining a constant value of the electromotive force of the motor at a definite voltage during both acceleration and retardation, and automatic switch means for making and breaking said circuits in predetermined time relation during the operation of the motor.

6. In automatic control means for centrifugal operating motors of the direct current shunt or compound wound type having a current supply source of sensibly constant potential, means for first progressively accelerating and then progressively retarding the operation of said motor during predetermined periods of time, said means including a plurality of electric circuits for supplying current from said supply source at variable potentials to the armature terminals of the motor, additional circuits for varying the field potential of the motor while maintaining a constant value of the electromotive force of the motor at a definite voltage during both acceleration and retardation, automatic switch means for making and breaking said circuits in predetermined time relation during the operation of the motor, and means for variably regulating the lapsed time interval between the acceleration and retardation operating periods of the motor.

7. In automatic control means for centrifugal operating motors of the direct current shunt or compound wound type having a current supply source of sensibly constant potential, means for first progressively accelerating and then progressively retarding the operation of said motor during predetermined periods of time, said means including a plurality of electric circuits for supplying current from said supply source at variable potentials to the armature terminals of the motor, additional circuits for varying the field potential of the motor, a switch for energizing said circuits including a movable member carrying the circuit making and breaking means and acting in its movement in one direction to accelerate the operation of the motor and during its movement in the reverse direction to retard the operation of the motor, a reversible motor for operating said movable switch part, and a circuit for said motor including electrically controlled reversing means energized at the end of the movement of said switch part in one direction to reverse the operation of said reversible motor.

8. In automatic control means for centrifugal operating motors of the direct current shunt or compound wound type having a current supply source of sensibly constant potential, means for first progressively accelerating and then progressively retarding the operation of said motor during predetermined periods of time, said means including a plurality of electric circuits for supplying current from said supply source at variable potentials to the armature terminals of the motor, additional circuits for varying the field potential of the motor, a switch for energizing said circuits including a movable member carrying the circuit making and breaking means and acting in its movement in one direction to accelerate the operation of the motor and during its movement in the reverse direction to retard the operation of the motor, a reversible motor for operating said movable switch part, a circuit for said motor, and an electrically controlled time clock connected in said circuit and energized at the end of the movement of said switch part in one direction to reverse the operation of said motor after the lapse of a predetermined interval of time.

9. Means for controlling the operation of centrifugal extractors including in combination with an electric motor of the direct current shunt or compound wound type having a current source of sensibly constant potential, means for first progressively accelerating and then progressively retarding the operation of said motor and variably regulating the lapsed time interval between the periods of acceleration and retardation, said means including fractional voltage circuits and independently operable means for successively establishing connection of the individual fractional voltage circuits between the source of current and the armature terminals of the motor, means for automatically making and breaking said fractional voltage circuits comprising a switch having a movable member operable during its movement in one direction to successively energize and de-energize said fractional voltage circuits, an additional circuit for the motor field having a plurality of resistances therein, said later circuit being energized and the resistances progressively short circuited in the movement of the switch member in the opposite direction, a reversible operating motor for said switch member and a circuit therefor automatically reversed at the end of the movement of said switch member in one direction, and manually operable switch means in the circuit of the switch motor adapted to close the motor circuit for the operation of the switch motor in each direction through additional circuit closing means controlled by said motor operated switch.

10. Means for controlling the operation of centrifugal extractors including in combination with an electric motor of the direct current shunt or compound wound type having a current source of sensibly constant potential, means for first progressively accelerating and then progressively retarding the operation of said motor and variably regulating the lapsed time interval between the periods of acceleration and retardation, said means including fractional voltage circuits and independently operable means for successively establishing connection of the individual fractional voltage circuits between the source of current and the armature terminals of the motor, means for automatically making and breaking said fractional voltage circuits comprising a switch having a movable member operable during its movement in one direction to successively energize and de-energize said fractional voltage circuits, an additional circuit for the motor field having a plurality of resistances therein, said latter circuit being energized and the resistances progressively short circuited in the movement of the switch member in the opposite direction, a reversible operating motor for said switch member, circuits for said switch motor, a primary manually operable switch controlling said circuits, said motor operated switch having means for energizing and de-energizing said circuits, and an electrically controlled time switch and circuit therefor energized by said movable switch member at the end of its movement in one direction and operating after a predetermined time interval to close the reversing circuit of said switch operating motor.

11. In combination with an automatic control switch for centrifugal operating motors including a movable switch member and means rendered operative thereby to energize and de-energize current supply circuits for the motor effective to progressively accelerate the operation of the motor in the movement of said switch member in one direction and to progressively decelerate the operation of the motor in the movement of said switch member in the opposite direction; a reversible motor for the movable switch member, a circuit for said motor including means for making and breaking said circuit constituting elements of said switch and operative to close the circuit at the end of the movement of said switch member in each direction, and means for reversing the field of the switch operating motor including a field reversing circuit, said switch having means operative at the end of the movement of the switch member in one direction to close said circuit, and electrically controlled means in said circuit energized when said switch member is in circuit closing position to close a second break in said circuit after the lapse of a predetermined time interval whereby the operation of the switch motor is reversed to move said switch member in the opposite direction.

12. In combination with an automatic control switch for centrifugal operating motors including a movable switch member and means rendered operative thereby to energize and de-energize current supply circuits for the motor effective to progressively accelerate the operation of the motor in the movement of said switch member in one direction and to progressively decelerate the operation of the motor in the movement of said switch member in the opposite direction; a reversible motor for the movable switch member, a circuit for said motor including means for making and breaking said circuit constituting elements of said switch and operative to close the circuit at the end of the movement of said switch member in each direction, and means for reversing the field of the switch operating motor including a field reversing circuit, said switch having means operative at the end of the movement of the switch member in one direction to close said circuit, and a time switch operative to close a second break in said circuit after a lapse of a predetermined time from the closing of said circuit by the movable switch member to thereby reverse the operation of the motor and move said switch member in the opposite direction.

13. In combination with an automatic control switch for centrifugal operating motors including a movable switch member and means rendered operative thereby to energize and de-energize current supply circuits for the motor effective to progressively accelerate the operation of the motor in the movement of said switch member in one direction and to progressively decelerate the operation of the motor in the movement of the switch member in the opposite direction; a reversible motor for the movable switch member, a circuit for said motor including means for making and breaking said circuit constituting elements of said switch and operative to close a break in the circuit when the switch member is at the end of its movement in each direction, and means for reversing the switch operating motor comprising a motor field reversing circuit, an electrically controlled time clock interposed in said circuit to close a normally open break therein, and said switch including additional means operative at the end of the movement of the switch member in one direction to energize said time clock and close the circuit after a lapse of a predetermined period of time to reverse the operation of the switch motor and move said switch member in the opposite direction.

14. In a system of regenerative braking control adapted for centrifugal extraction of solids, in combination with a direct current shunt or compound wound dynamo-electric machine, a resistance in series with the shunt field, any portion or all of which may be short circuited, a source of electrical energy at sensibly constant potential to energize the shunt field, an automatic control means adapted to so progressively short circuit said resistance as to effect a braking torque of predetermined value and, as the speed of the armature of the dynamo-electric machine decreases, maintain said value or increase it or vary it in a predetermined manner throughout a predetermined portion of the braking period while maintaining a constant value of the electromotive force of the dynamo electric machine.

In testimony that we claim the foregoing as our invention we have signed our names hereto.

NATHANIEL R. ANDREWS.
JACOB J. NEUMAN.